United States Patent [19]

Holekamp

[11] 4,170,079

[45] Oct. 9, 1979

[54] DREDGE WITH ROTATABLE CUTTER DISCS

[76] Inventor: Malcolm L. Holekamp, 344 Gray Ave., St. Louis, Mo. 63119

[21] Appl. No.: 739,541

[22] Filed: Nov. 8, 1976

[51] Int. Cl.$^2$ ............................................. E02F 3/88
[52] U.S. Cl. ............................................. 37/65; 37/57; 37/72; 9/8 R
[58] Field of Search ............................... 37/64–67, 37/91, 189, 190, 77; 56/29, 295; 172/45, 111, 120

[56] References Cited

U.S. PATENT DOCUMENTS

| | | | |
|---|---|---|---|
| 275,534 | 4/1883 | Spearing | 37/77 |
| 534,983 | 2/1895 | Von Schmidt | 37/67 |
| 635,890 | 10/1899 | Hill | 37/67 |
| 705,784 | 7/1902 | Perry | 37/67 |
| 805,965 | 11/1905 | Jones | 37/67 |
| 939,227 | 11/1909 | Diehl | 37/64 |
| 1,055,548 | 3/1913 | McChesney | 37/189 |
| 1,198,589 | 9/1916 | Shellaberger | 172/111 |
| 1,246,990 | 11/1917 | Ohlhausen | 37/67 |
| 1,436,015 | 11/1922 | Cushing | 37/67 |
| 1,730,958 | 10/1929 | Van Wienen | 37/67 |
| 1,777,575 | 10/1930 | Penney | 37/66 X |
| 2,040,068 | 5/1936 | Ziegler | 172/120 |
| 2,680,337 | 6/1954 | Whipple | 172/45 X |
| 2,706,441 | 4/1955 | Caldwell et al. | 172/111 |
| 2,721,438 | 10/1955 | O'Maley | 56/295 |
| 2,762,136 | 9/1956 | Bell | 37/67 |
| 2,877,985 | 3/1959 | Petersen | 37/142 R X |
| 2,926,436 | 3/1960 | Humphreys | 37/67 |
| 2,936,564 | 5/1960 | Berry | 56/295 |
| 3,574,989 | 4/1971 | Rousseau et al. | 37/91 X |

FOREIGN PATENT DOCUMENTS

| | | | |
|---|---|---|---|
| 1484659 | 1/1969 | Fed. Rep. of Germany | 37/65 |
| 92978 | 12/1959 | Netherlands | 37/67 |
| 116552 | 1/1959 | U.S.S.R. | 37/65 |
| 243303 | 9/1969 | U.S.S.R. | 56/295 |

Primary Examiner—Clifford D. Crowder
Attorney, Agent, or Firm—Polster, Polster and Lucchesi

[57] ABSTRACT

In a vessel-mounted dredging device in which material freed by revolving cutters is pumped through a suction mouth and discharge pipe to a place remote from the cutters, a submersible dredge pump is mounted on a platform which supports cutter discs spaced from one another and positioned to deliver material to the suction side of the pump. Trapezoidal teeth are pivotally mounted to swing to either side of a radius of each cutter disc, making the teeth effective for either direction of rotation of the cutter disc. The cutter discs are selectively rotatable in either direction, preferably counter-rotating with respect to one another. The platform is mounted on a mast which is so constructed and arranged as to be movable vertically. The vessel itself is so constructed as to permit a discharge pipe to extend fore and aft along the center line of the vessel. The discharge pipe is connected at one end to the discharge side of the pump, and supported at its other end on rollers at the after section of the vessel, permitting translation of the pipe in response to upward and downward movement of the platform. The platform is preferably hinged to the end of the mast, to permit the platform to swing to an angle to the horizontal, selectively.

The cutter discs are driven by hydraulic motors, acting through speed reducers which are supplied with lubricant under constant, superatmospheric pressure.

The vessel is preferably provided with outboard pontoons, hinged in such a way as to permit their being swung to a position above the main deck.

3 Claims, 14 Drawing Figures

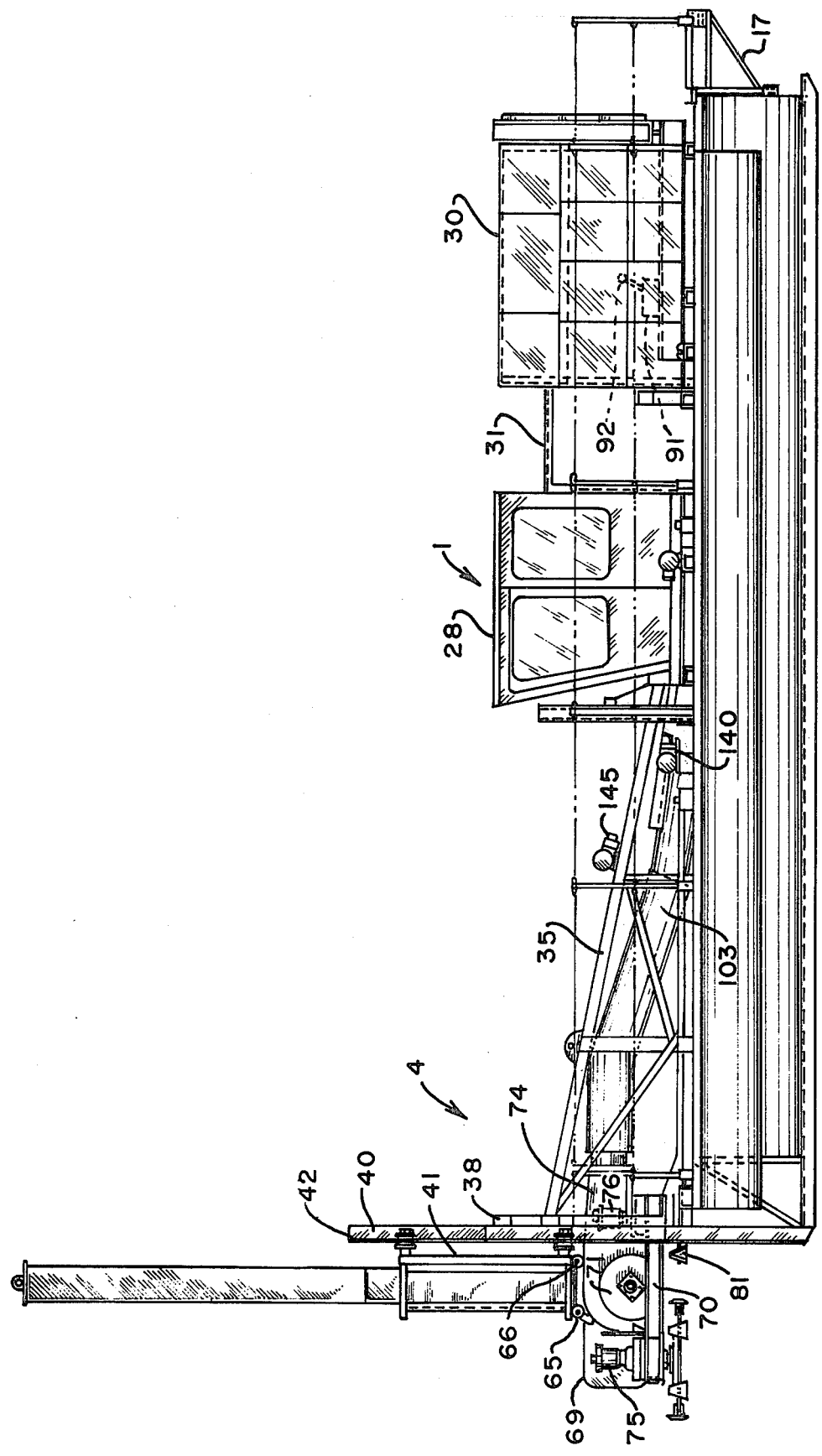
FIG. I.

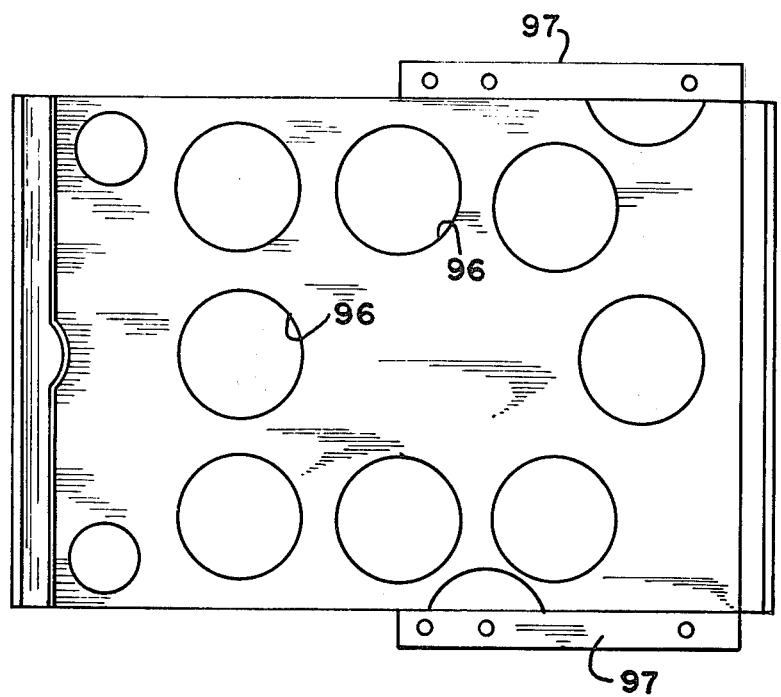
FIG. 7.
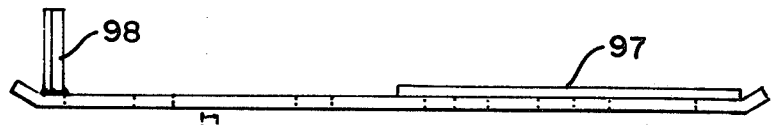
FIG. 8.
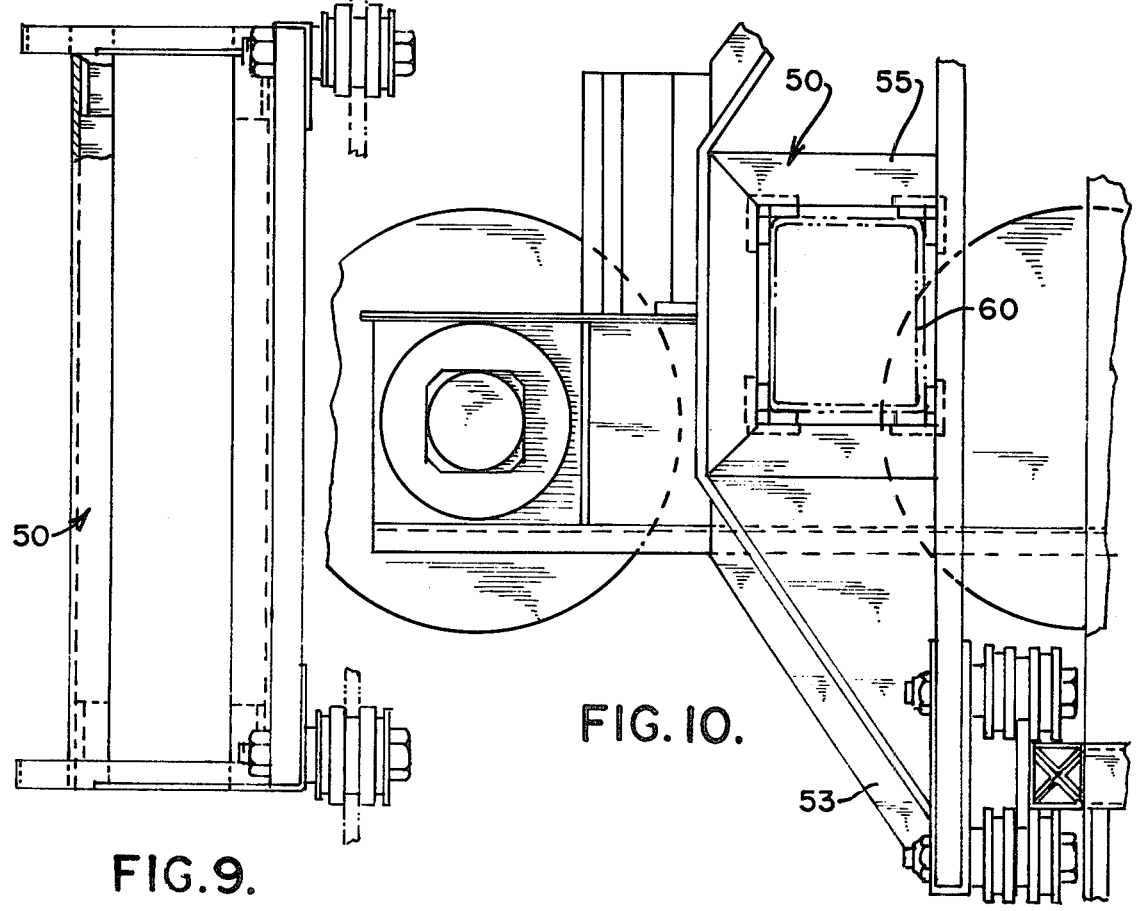
FIG. 9.
FIG. 10.

DREDGE WITH ROTATABLE CUTTER DISCS

BACKGROUND OF THE INVENTION

The dredging art is an old one. Examples of the general type of dredge of this invention are shown in U.S. Pat. Nos. 222,380 (Dec. 9, 1879), 277,177 (May 8, 1883), and 890,764 (June 16, 1908). The present invention is directed to a more efficient, simple, dependable and versatile dredging device than those known heretofore. In the preferred embodiment, the entire dredge, vessel and all, can be stowed in such a way as to permit it to be lifted by a crane and transported on a conventional heavy low-bed trailer.

SUMMARY OF THE INVENTION

In a vessel-mounted dredging device in which material freed by revolving cutters is pumped through a suction mouth and discharge pipe to a place remote from the cutters, a platform, upon which a pump is mounted, and beneath which cutter discs are mounted, is itself mounted to the lower end of a mast. The mast is arranged for movement vertically with respect to a vessel upon the bow of which it is mounted. The vessel is made with main pontoons running fore and aft, spaced from one another about the center line of the vessel a distance sufficient to accommodate a discharge pipe, one end of which is connected to the discharge side of the pump, and the other end of which is cradled on rollers, permitting lengthwise translation of the discharge pipe as the pump is moved up and down by the mast.

The mast is journalled in a long bearing which in turn is carried by a carriage mounted on vertical posts or stanchions, for movement vertically along the posts.

The cutter discs are equipped with trapezoidal teeth oriented generally parallel to the axis of rotation of the discs, and pivotally mounted on the discs on pivot axes parallel to the axis of rotation of the disc, in such a way that the teeth can swing to either side of a radius. In the preferred embodiment, two cutting discs are provided, with axes of rotation substantially aligned in the fore and aft direction with respect to the vessel. The cutter discs lie in substantially the same plane and are spaced from one another below a suction inlet of the pump. The cutter discs are rotated by hydraulic motors, acting through speed reducing gear boxes mounted on the platform. The gear boxes are preferably supplied with lubricant under constant, superatmospheric pressure. The entire platform is preferably hingedly connected to the mast, so as to be selectively swingable to an angle from the horizontal.

As has been indicated, the discharge pipe extends along the center line of the vessel, and, when the pump is in its raised position, extends into and through a clear space or well between the main pontoons making up the main hull of the vessel and its forward end extends above the main deck level.

Outboard pontoons are hingedly supported by the main pontoons, permitting them to move between a position outboard of the main hull to a buoying and stabilizing position, and a position wholly above the main hull.

A spoil line, connected to and forming an extension of the discharge pipe, is floated by means of tire carcasses filled with foamed plastic, spaced along the spoil line.

BRIEF DESCRIPTION OF THE DRAWINGS

In the drawings,

FIG. 1 is a view in side elevation of one embodiment of dredging device of this invention;

FIG. 7 is a top plan view of a perforated shoe normally covering the mouth of the inlet side of the pump;

FIG. 8 is a view in side elevation of the shoe shown in FIG. 7;

FIG. 9 is a fragmentary detailed view in side elevation of the mast carriage and mast bearing of the embodiment shown in FIG. 1;

FIG. 10 is a fragmentary top plan view of the cutter and mast part of the device;

DESCRIPTION OF THE PREFERRED EMBODIMENT

Figure 3:
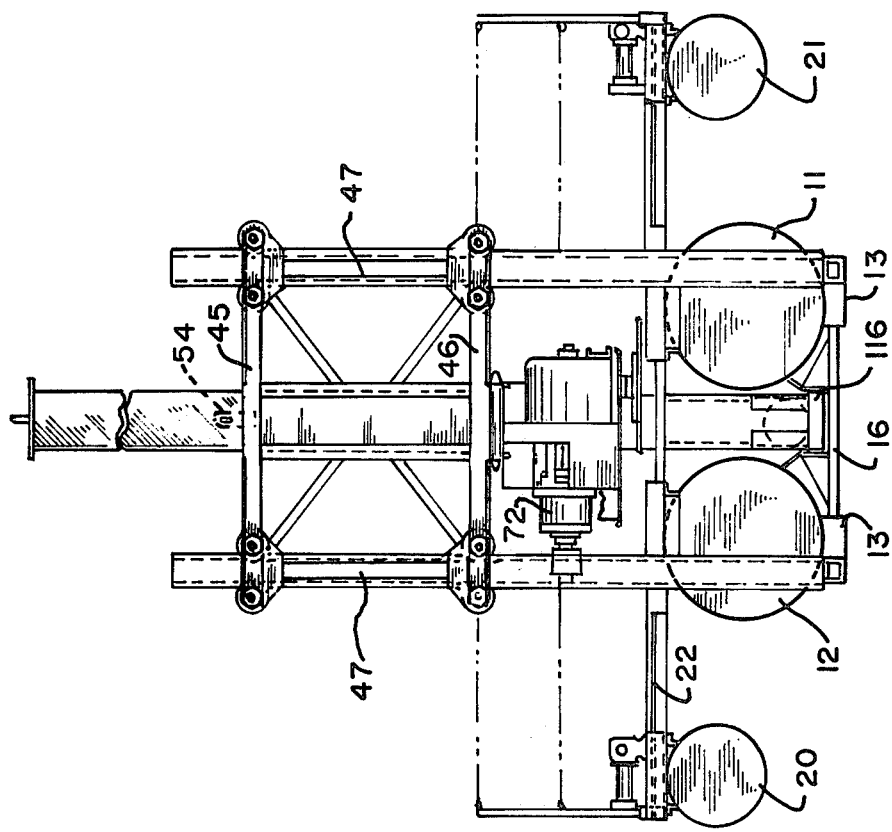
FIG. 3 is a view in end elevation viewed from left to right in FIG. 1.

Referring now to the drawings for one illustrative embodiment of dredging device of this invention, reference numeral 1 indicates a dredge vessel, with a cutter-pump section 4 at its bow, a discharge pipe assembly including a discharge pipe support section 9 in the stern portion of the vessel, and a spoil line assembly 10.

The vessel 1 has a main hull 2 made up of main pontoons 11 and 12, each of which is provided with heavy channel skids 13 extending the full length of the pontoons and beyond them in a forward direction, a main deck 14, secured to the pontoons by means of angles 15, and suitable bracing. The bracing includes an after cross bar 16, between the skids 13 below the main pontoons, and a stern cross bracing truss. The forward cross bracing is such as to provide an open well or channel 25 along the center line of the vessel from the bow to a point which in this embodiment is approximately a third of the distance toward the stern.

Figure 2:
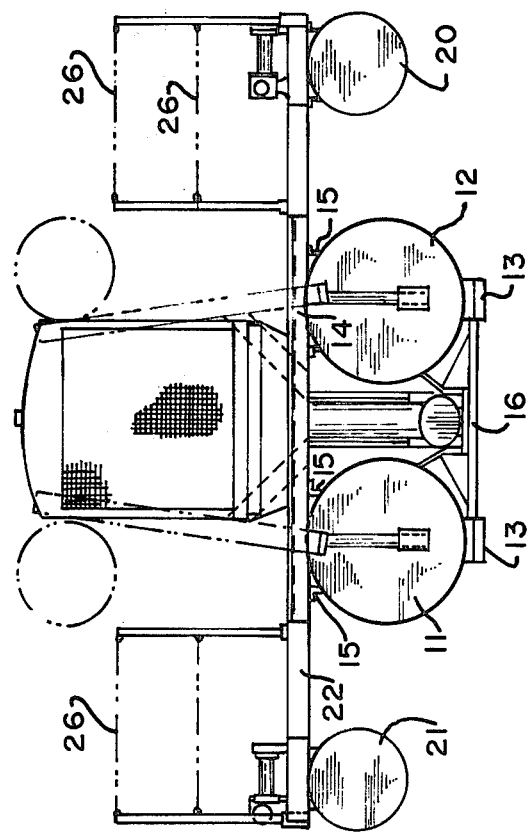
FIG. 2 is a view in end elevation, viewed from right to left in FIG. 1, showing, in dotted lines, the outboard pontoons in folded position.

The main pontoons extend fore and aft of the vessel, and are spaced from one another about the center line of the vessel, as shown particularly in FIGS. 2 and 3.

Outboard pontoons 20 and 21 have arms 22 secured at one end to the main pontoons 20 and 21, pivotally mounted at their other ends to angle members carried by the main pontoons 11 and 12. Suitable removable locking pins are provided for locking the arms in the extended and folded positions, respectively. The arms 22 and light angles 23 carry outboard decking, and life lines 26. The life line stanchions are removably mounted, but the outboard decking can be left in place when the outboard pontoons 20 and 21 are folded to the transport position shown in dotted lines in FIG. 2.

A control house 28 is provided on the main deck, and a large diesel engine 30 and a hydraulic pump house 31 are mounted on the main deck abaft the control house.

Also secured to the main deck, on either side of the well 25, are two long heavy truss braces 35, which slope upwardly to the bow, at which they are secured to a heavy, cross braced mast supporting frame 38. The frame 38 has cross members 39, all of which are above the main deck sufficiently to accommodate the discharge pipe in a raised position, all as described hereafter.

Figure 4:
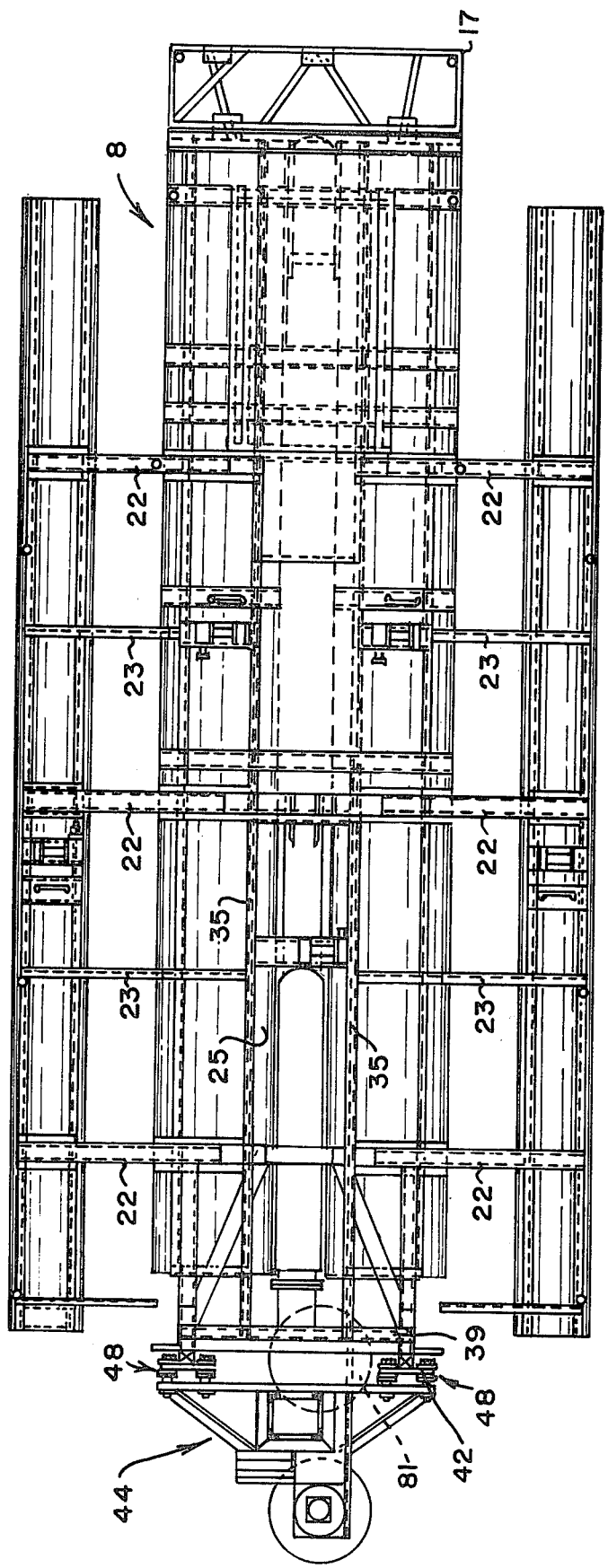
FIG. 4 is a top plan view, with the decking removed, of the device shown in FIG. 1.
Figure 5:
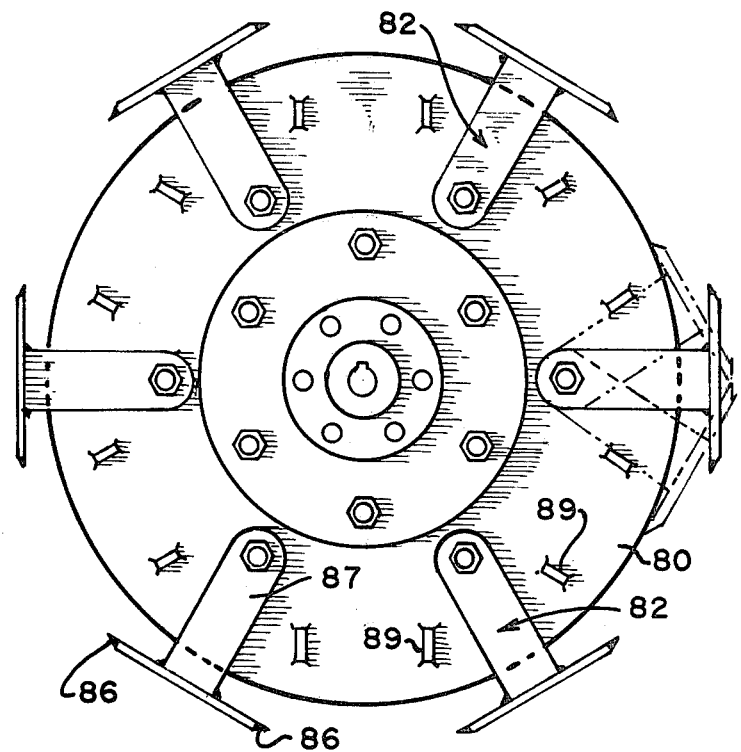
FIG. 5 is a top plan view of one cutter disc.

The mast frame 38 is secured to tubular stems 41 of T-shaped guide posts 40. The guide posts 40 are welded at their lower ends to the ends of skids 13, and are braced above and below the main deck, as indicated in FIGS. 1 and 4, to ensure their strength and rigidity. The lower bracing is forward of the main pontoon on each side, the skid extending beyond the pontoon. The guide posts 40 are parallel with one another. They have guide plates 42 welded to them, which extend substantially the full length of the posts. The guide plates project symmetrically to either side of the stem 41, providing ways for flanged rollers 48 mounted on a mast carriage 44.

The mast carriage 44 is a cross-braced rectangular frame with upper and lower cross members 45 and 46, and vertical members 47. The rollers 48 are mounted in pairs as best shown in FIGS. 3 and 4, projecting aft from the cross members 45 and 46, and so positioning and arranged that the flanged rollers embrace the long side edges of the guide plates 42 in both fore and aft and athwartships directions. The pairs of rollers 48, located as they are at the four corners of the carriage 44 and spaced a substantial distance vertically, ensure against undesired movement in a fore and aft direction, and against any cocking in their up and down travel. Detailed view of the rollers and their relation to the guide posts are shown in FIGS. 9 and 10.

An elongated sleeve bearing 50, shown most clearly in FIGS. 1, 3, 4, 9, and 10, is secured to the cross members 45 and 46 of the carriage 44. In the embodiment shown, the sleeve 50 includes upper and lower heavy frame members 55, defining a rectangular opening into the corners of which angles 51 are welded, extending vertically. Low-friction plastic inserts 52, such as Delrin or Teflon, serve as facings for the angles 51 and as bearing surfaces for a mast 60. The sleeve bearing 50 is given additional support, in the embodiment shown, by angle braces 53, at top and bottom, secured to the vertical members 47 of the carriage. A lifting eye 54, is shown in dotted lines in FIG. 3.

In the embodiment shown, the mast 60, which is rectangular in cross section, is made in two parts, a top section 61 and a lower section 62, so joined as to provide no obstruction to easy sliding through the bearing 50. A mast base plate 64, secured to the lower end of the mast, carries in this embodiment, knuckles 65 and 66.

Figure 14:
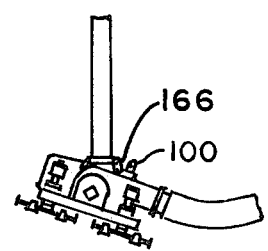
FIG. 14 is a fragmentary view in side elevation of the mast and platform, showing the platform in tilted position.

Platform knuckles 67 and 68 are secured to a platform bracket 69. The platform knuckles 67 are complementary to the mast base plate knuckles 65, and with a suitable pintle, serve to mount a platform 70 to which the bracket 69 is secured, to the mast 60. The other set of platform knuckles, 68, serves selectively either to mount the platform immovably perpendicular to the long axis of the mast when a pintle is inserted directly through the knuckles 66 and 68, or, when desired as shown in the embodiment illustrated particularly in FIG. 14, serve, with the mast base plate knuckles 66 to accommodate a link 166, permitting rocking of the platform to an angle from the horizontal to provide for slope cutting.

The platform 70 consists of a channel iron frame, on which a pump 71, driven by a hydraulic motor 72, is mounted. The pump 71 has an inlet mouth extending through an opening in the platform frame, and a discharge outlet pipe 74 above the frame of the platform.

Also mounted on the platform frame are hydraulic cutter disc drive motors 75 and 76, each with a speed reducer 77. Each of the speed reducers has an output shaft 78 projecting below the frame of the platform.

The output shaft 78 of the speed reducer of the hydraulic motor 75 is connected to a hub 79 of a cutter disc 80. The output shaft 78 of the speed reducer of the motor 76 is connected to a hub 79 of a cutter disc 81.

In the embodiment shown, each of the cutter discs 80 and 81 has six tooth assemblies 82. Each of the tooth assemblies 82 consists of a trapezoidal cutting tooth 83 with a long base 84, a short base 85 and upwardly convergent, chamfered sides 86. In the preferred embodiment, the cutting surfaces of the chamfered sides are faced with tungsten carbide, welded directly to the teeth. The cutting teeth 83 are, in this embodiment, substantially flat, and are welded to the outer ends of upper and lower, vertically spaced, tooth arms 87, pivotally mounted at their ends opposite the cutting teeth on pivot pins 88 mounted radially inboardly from the perimeter of the cutter disc at 60° intervals on a common circle concentric with the axis of the shaft 78. The tooth arms 87 are longer, from their pivot points to the blades, than the distance to the perimeter of the disc, permitting the teeth to be swung in either direction to one side of the radial line defined by the axis of rotation and the pivot point. Stops 89 on the upper face of the cutter discs, are arranged symmetrically on either side of the radial line, to limit the amount of swing of the tooth arms. In use, the teeth swing to an angle to the radial line, in the direction opposite the direction of rotation, thus accommodating themselves to digging condition in either direction of rotation.

The cutter discs 80 and 81 lie in substantially the same plane, and are spaced from one another and with respect to the inlet mouth of the pump 71. In this preferred embodiment, their axes of rotation are substantially aligned with the center line of the vessel. The hydraulic motors 75 and 76 generally drive the cutter discs 80 and 81 in a counter-rotating fashion, but they are individually controllable both as to speed and direction of rotation.

A flexible lubricant tube 90 communicates with the interior of each speed reducer 77 at one end, and at its other end, with a lubricant reservoir 91, equipped with a pressure pump 92 by which lubricant in the reservoir can be subjected to superatmospheric air pressure.

Figure 6:
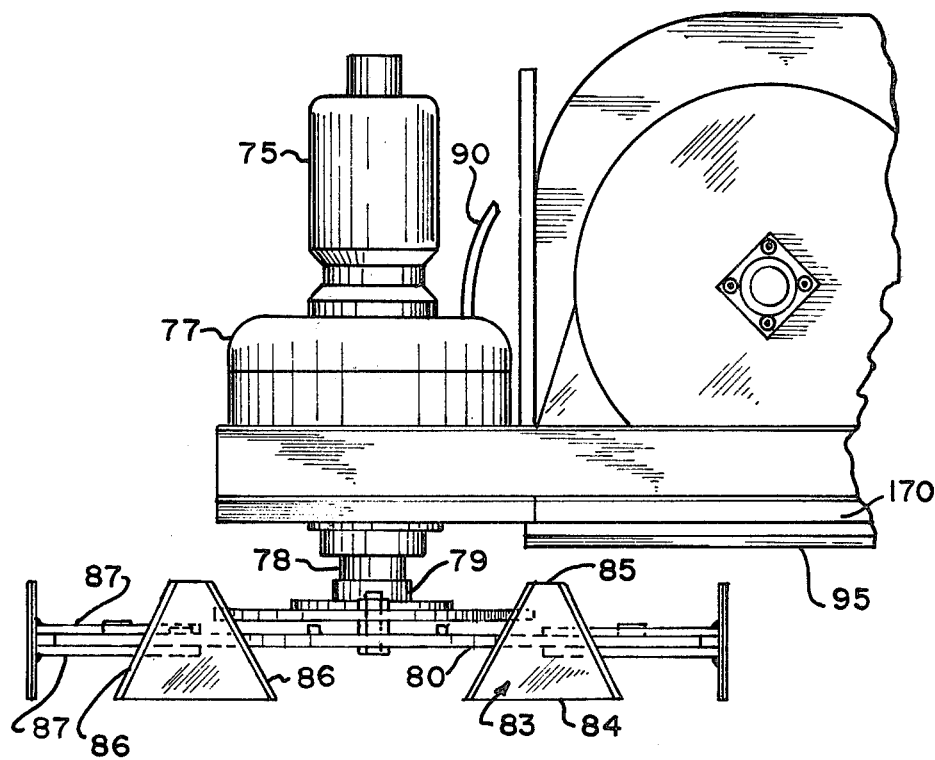
FIG. 6 is a fragmentary view in side elevation of a cutter disc, mounting platform, cutter disc drive and pump parts of the dredging device.
Figure 11:
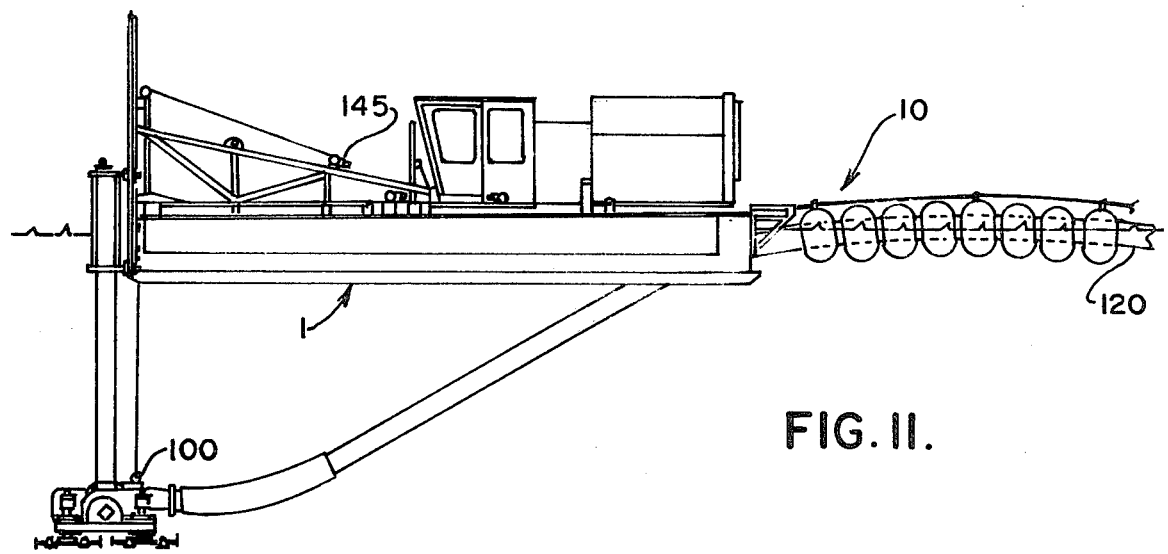
FIG. 11 is a view in side elevation showing the cutter and pump platform in dredging position, and the arrangement of the spoil line.

A shoe 95, of heavy plate, is positioned below and spaced a short distance from the inlet mouth of the pump 71 along the side shown in FIG. 6, to leave a clear opening as indicated by reference numeral 170, and above the cutter teeth 83. The shoe 95 has holes 96, which in the embodiment shown, are on the order of 6 inches in diameter, through it. The shoe serves a double function, of screening objects of such a size as to be likely to injure the impeller of the pump 71, and to prevent the inlet from scraping the bottom. The shoe 95 is mounted on the underside of the platform, by means of mounting wings 97 and a mounting bracket 98. Lips 99 reduce the opening between the shoe and the mouth. A cable eye 100 is secured to the platform, to receive a hook or clevis on the end of a lifting cable 165, as shown in FIG. 11.

A flexible connector section 103 of a discharge pipe 105 is connected at one end to the discharge outlet pipe 74 of the pump 71, and at its other end to a rigid section 104 of the discharge pipe 105. The rigid section 104 of the discharge pipe is cradled on and supported by a roller 116 mounted on and above the after cross bar 16, between guide gussets; the discharge pipe is otherwise unsupported between the pump and the roller. The discharge pipe 105 runs fore and aft along the center line of the vessel, between the main pontoons 11 and 12, and, in the raised position shown in FIG. 1, through open well 25, to a position at which its forward end is above the main deck level.

At its after end, the discharge pipe is connected with and communicates with a flexible spoil line 120.

The spoil line 120 is kept afloat by a series of spaced floatation elements 121 which, in the embodiment shown, take the form of tire carcasses 123, beaded mouths 124 of which have been spread until the distance between edges of the mouths is greater than the radial distance from the surface defined by the mouths to the outermost surface of the carcass, and filled with foamed plastic material. The floatation elements 121 are strung on the spoil line, as indicated particularly in FIG. 11.

Figure 12:
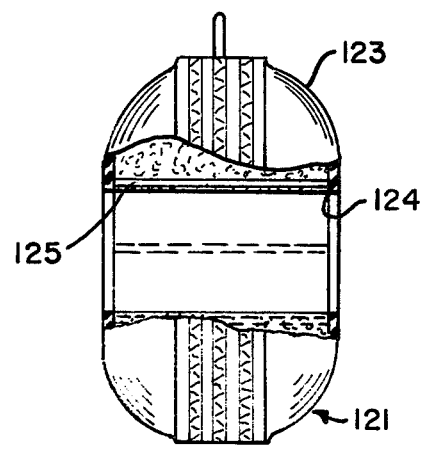
FIG. 12 is a view in side elevation, partly broken away, of a float element of the spoil line.
Figure 13:
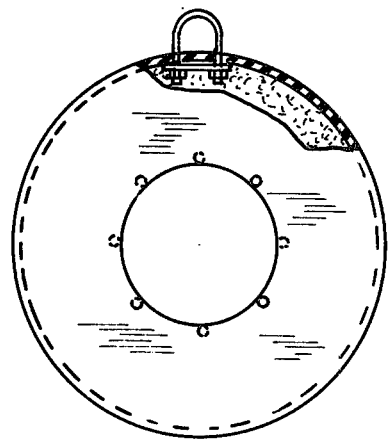
FIG. 13 is a view in front elevation, partly broken away, of the float element of FIG. 12.

In making the floatation elements 121, the mouths of the tire carcasses are spread with dowels 125, the carcass is placed around a plate on a revolving fixture, and the prepared polyurethane or polystyrene is poured onto the plate and thrown into the carcass by centrifugal force, intumescing and setting in place. A certain number of carcasses can be provided, before the foamed material is placed, with U-bolts, forming eyes for a stay line 128 as shown in FIGS. 11 through 13.

Suitable hydraulically operated winches 140 are provided, for maneuvering the vessel by means of anchor lines. A winch 145, mounted on a cross beam bridging between the brackets 35, controls cable 165, tending over a suitable sheave carried by the frame 38, and connected at its outer end with the eye 100 for raising and lowering the mast and carriage.

By virtue of the provision of the carriage, the entire assembly can be raised well clear of the water, while at the same time, in use, the bearing sleeve in which the mast is journalled for sliding can be moved down to support the mast at its lowered position, thus permitting additional effective depth to the dredging head. Additionally and importantly, when the carriage is in its lowered position, it provides effective cross bracing to the guide posts 40 and main pontoons, which, it will be observed, are not otherwise directly braced, below the main deck, against spreading.

Suitable, conventional hydraulic lines are connected to hydraulic pumps driven by the diesel engine 30, to the cutter motors, the pump motor, and the various winches. In the preferred embodiment, the hydraulic system consists of four independent circuits, one for the dredge pump, one for each of the two cutter motors, and one for the winches.

Merely by way of illustration and not by way of limitation, a dredge of this invention can have an overall hull length of 33', a main hull width of 8', and an overall width, with the outboard pontoons extended, of 16'.

The operating depth, i.e., water level to cutter disc distance as shown in FIG. 11, can be 16'.

The pump can be a conventional impeller equipped centrifugal dredge pump, with an inlet mouth on the order of 18 inches square, and a discharge outlet pipe 12 inches in inside diameter, to which a 12 inch i.d. discharge pipe is connected.

The cutter discs can be ½ inch thick and 36 inches in diameter, the cutter teeth arms can be 9 inches from pivot point to the teeth, and the teeth project 3 inches beyond the periphery of the dishes in their radial position. The teeth which are preferably made of ½ inch high carbon steel, can have a long base length of 10 inches, a short base length of 2 inches, and a height of 6 inches. The chamfered cutting edges of the teeth are preferably faced and backed with tungsten carbide, welded to the edges.

The cutter discs 80 and 81 are arranged symmetrically with respect to the pump inlet mouth, in both fore and aft and athwartships directions, have their axes of rotation generally aligned with the center line of the vessel, and are spaced from one another four feet center to center so as to permit their respective teeth to clear one another by about 6 inches. In this illustration, the cutter discs are positioned so that the upper, short base edges of the teeth are about 2 inches below the shoe 95.

The shoe is in turn positioned so that a space of about 1 inch is left along a side of the shoe between the shoe and the bottom of the pump.

The hydraulic pumps can have a rating in excess of 500 hp, and the diesel engine 30 can be a twelve cylinder diesel, as for example, a General Motors Detroit 12V71. The dry weight of the vessel and dredging head can be on the order of 31,000 lbs., making is possible to skid or crane load it onto a single low-bed trailer.

When it is desired to dredge a 1:3 slope, it is only necessary to pull the pin in the knuckles 66 and 68, and insert the link 166 between them, to tilt the platform.

Numerous variations in the details of construction of the dredging device of this invention within the scope of the appended claims will occur to those skilled in the art in the light of the foregoing disclosure.

Having thus described the invention, what is claimed and desired to be secured by Letters Patent is:

1. In a dredging device in which material freed by revolving cutters is pumped through a downwardly directed suction mouth and a discharge pipe to a place remote from the cutters, the improvement comprising a plurality of substantially continuous, imperforate, planar cutter discs mounted adjacent said suction mouth, said cutter discs being positioned substantially parallel to a suction mouth-defining frame, beneath said mouth and extending laterally from beneath said mouth beyond said mouth, said discs lying in generally the same plane and being spaced from one another and with respect to said open mouth; as to each of said discs, means for rotatably driving said disc about an axis of rotation generally perpendicular to the plane of said disc, and cutting teeth supported by said disc, said teeth being symmetrical in side elevation about a center line substantially parallel to said axis of rotation, substantially planar, thin, relative to their height and width and chamfered along sides which tend convergently from their lower edge to their upper edge, said teeth being mounted on arms pivotally mounted on said disc on axes perpendicular to said disc, said teeth extending in an axial direction beyond upper and lower surfaces of said disc, being oriented in a direction generally parallel to the axis of rotation of the disc and spaced radially outwardly from the periphery of said disc to permit swinging of said teeth, stops on a broad surface of the disc, the swing of said tooth arms being limited by the engagement of said arms and stops to a limited arc to either side of a radius of said disc, and means for reversing the direction of rotation of said disc.

2. The improvement of claim 1 wherein tungsten carbide is welded to surfaces of said chamfered sides.

3. In a dredging device, carried by a marine vessel, elongated in a direction fore and aft, in which material freed by revolving cutters is pumped through a suction mouth and a discharge pipe to a place remote from the cutters, the improvement comprising a pair of planar, continuous, substantially imperforate cutter discs, mounted below, adjacent and positioned on opposite sides of said suction mouth, said discs being oriented with their axes of rotation parallel with one another in a plane extending in a direction fore and aft with respect to said vessel, said disc lying in generally the same plane and being spaced from one another and with respect to the open mouth of said suction pipe, teeth carried by said discs, oriented perpendicularly to the planes of said discs and extending beyond both planar surfaces thereof, said teeth being symmetrical about an axis substantially perpendicular to the planes of said discs, with sides tending convergently from a base and having their bases below and parallel to the planes of said discs, said teeth being oriented generally parallel to the axes of rotation of the discs, pivotally mounted on, symmetrically about and extending radially beyond said discs for swinging about an axis perpendicularly to said discs, means for rotating said discs selectively in either direction, said means including individual hydraulic motors, one connected to each of said discs, mounted adjacent said disc for vertical movement therewith, and a suction pump mounted between said hydraulic motors.

* * * * *